UNITED STATES PATENT OFFICE.

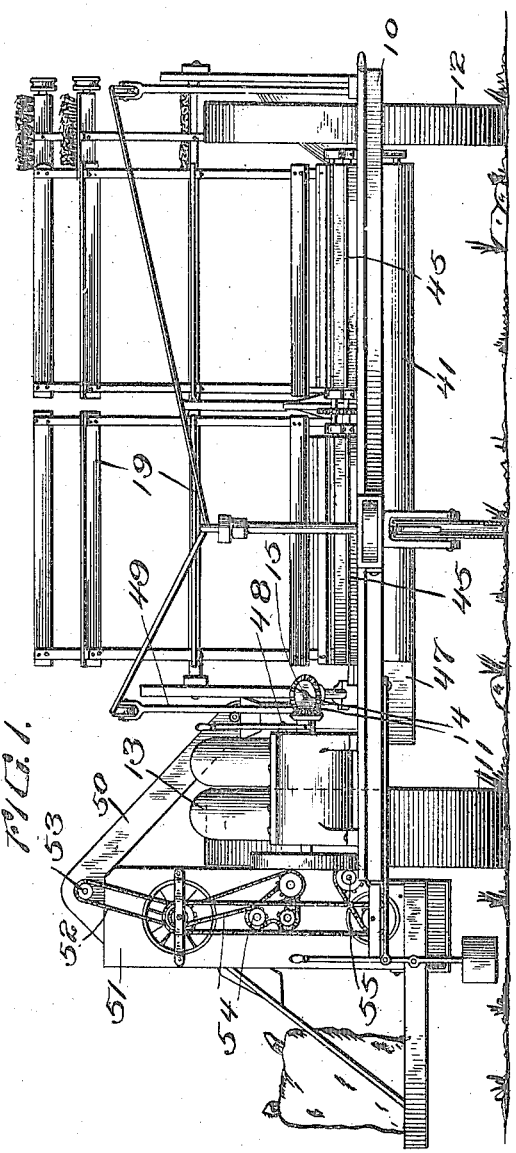

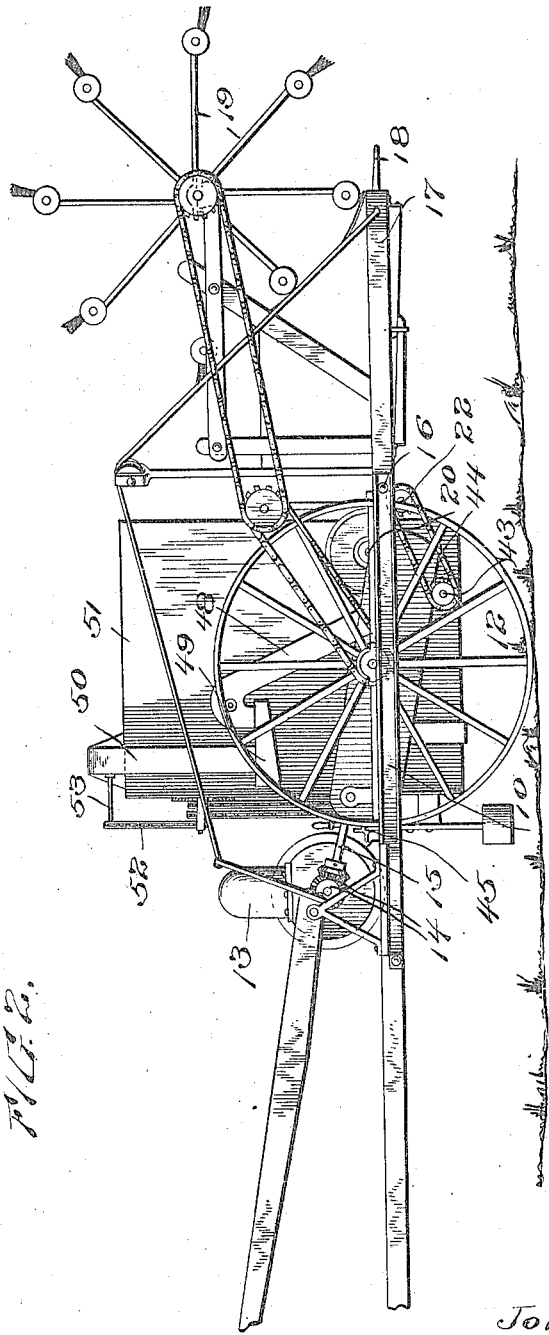

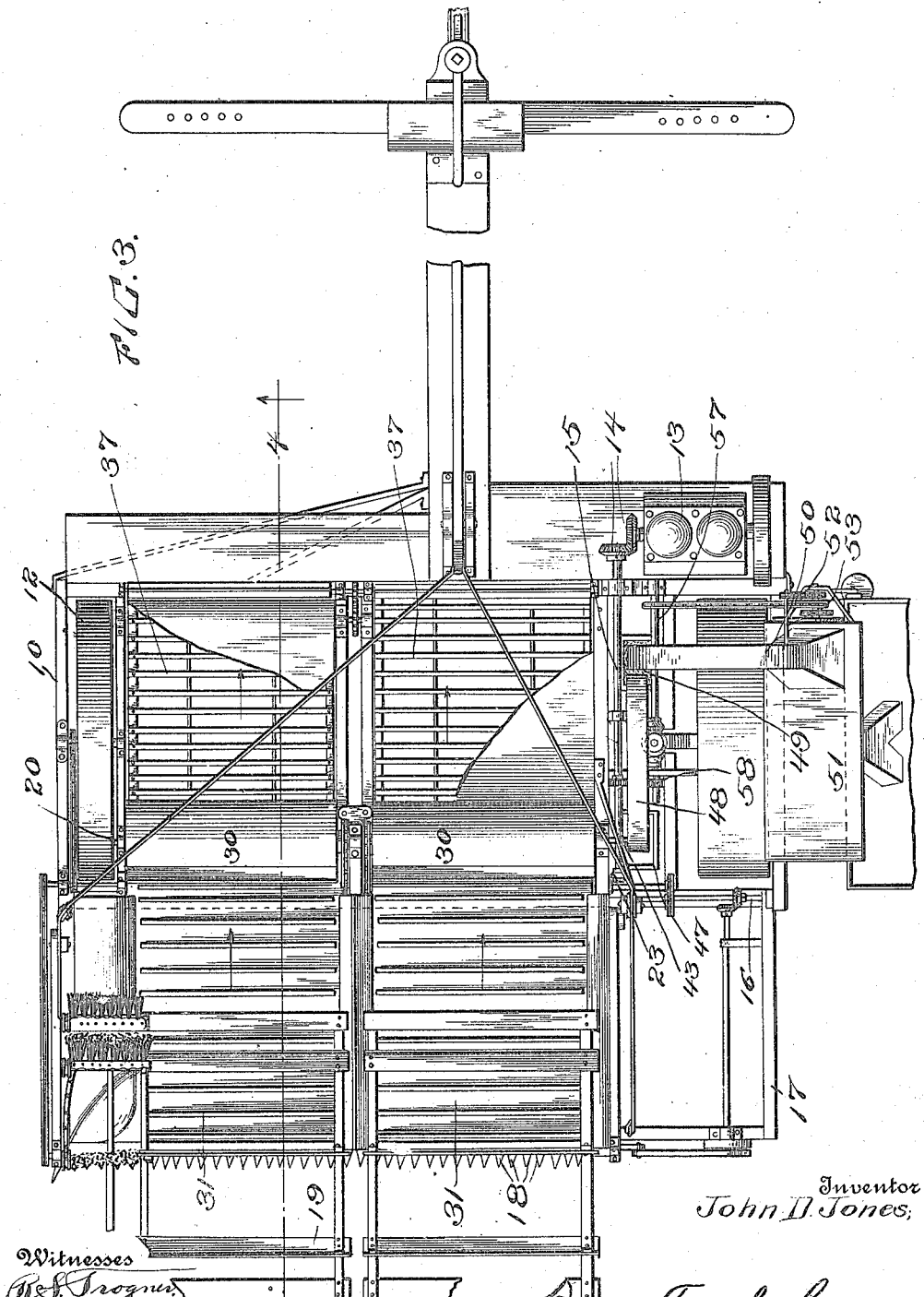

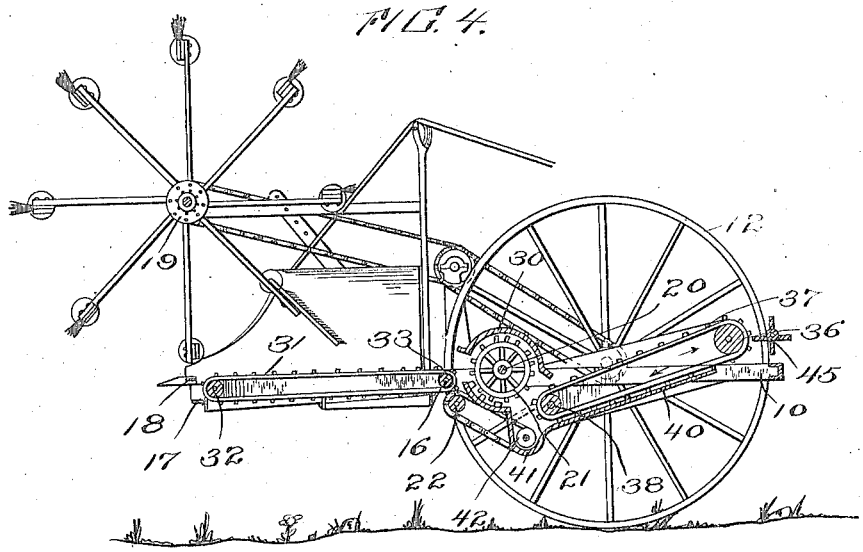

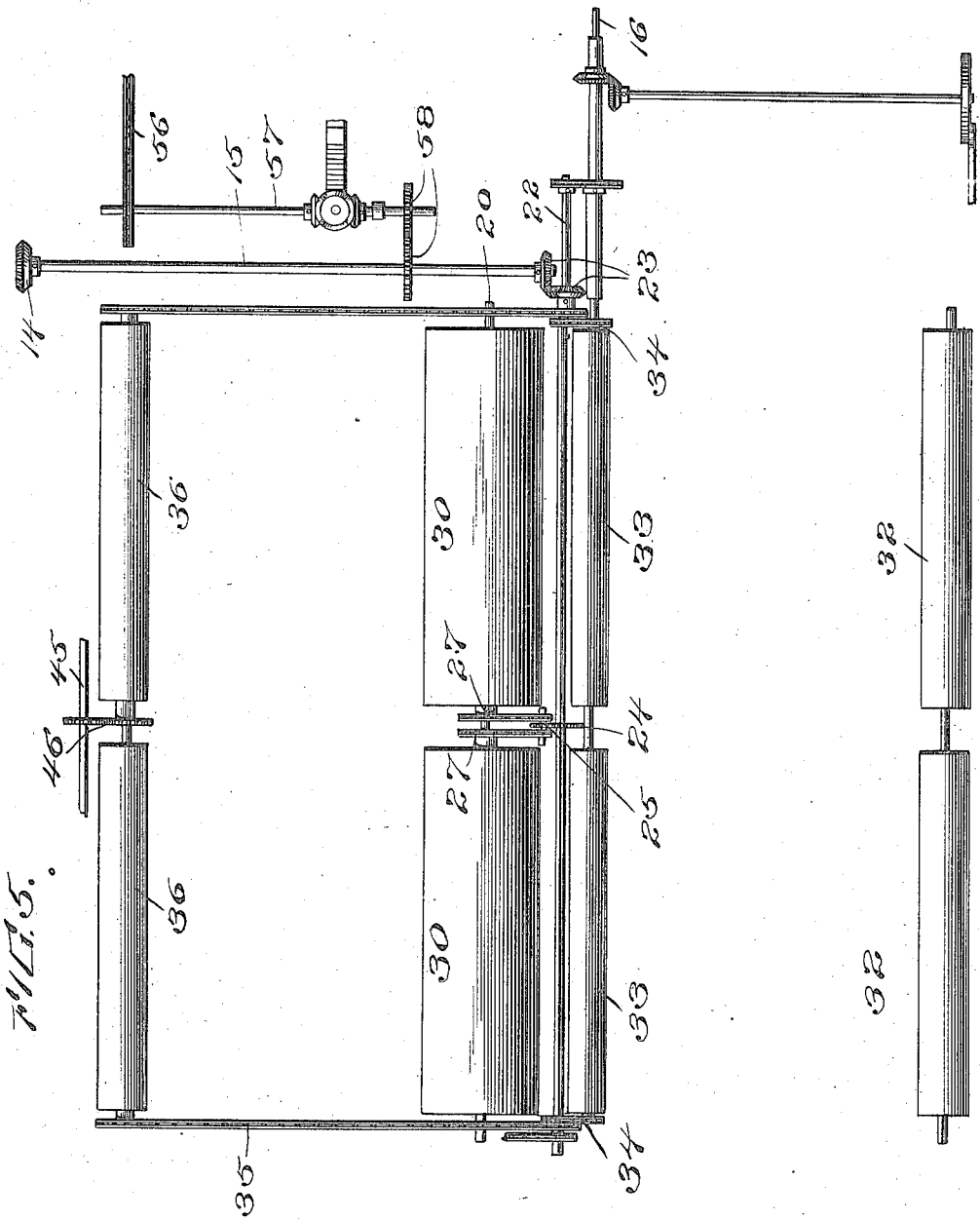

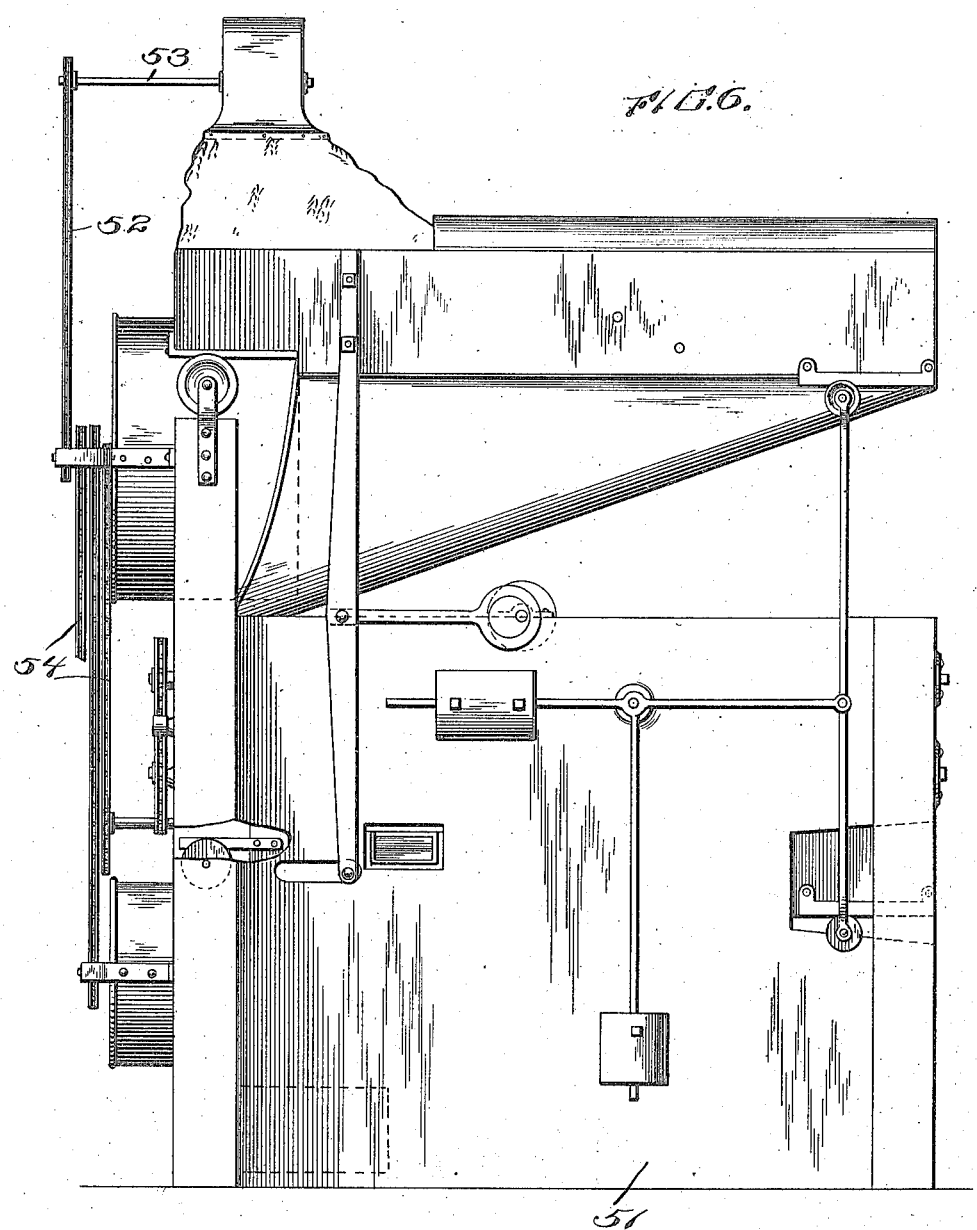

JOHN D. JONES, OF WALLA WALLA, WASHINGTON.

THRESHING-MACHINE.

1,254,506. Specification of Letters Patent. Patented Jan. 22, 1918.

Original application filed January 24, 1913, Serial No. 744,021. Divided and this application filed February 24, 1913, Serial No. 750,204. Renewed April 18, 1917. Serial No. 163,039.

*To all whom it may concern:*

Be it known that I, JOHN D. JONES, a citizen of the United States, residing at Walla Walla, in the county of Walla Walla and State of Washington, have invented certain new and useful Improvements in Threshing-Machines; and do hereby declare the following to be a full, clear, and exact description of the invention, such as will enable others skilled in the art to which it appertains to make and use the same.

This invention relates to threshing mechanisms and has for an object to provide an improved threshing mechanism disclosed in and a division of copending application 744,021, filed January 24th, 1913.

A further object of the invention is to provide a cylinder mounted upon a wheel supported frame with improved means for feeding the grain to and removing the straw from the cylinder.

A further object of the invention is to provide improved means for taking the threshed grain, chaff and the like from the cylinder and conducting it to a cleaner which said cleaner forms the subject matter of a copending divisional application, Serial No. 750,205, filed February 24, 1913.

A further object of the invention is to provide improved means for driving the threshing cylinder which said threshing cylinder forms the subject matter of a copending divisional application, Serial No. 749,097, filed February 18, 1913.

With these and other objects in view the invention comprises certain novel constructions, combinations and arrangement of parts as will be hereinafter more fully described and claimed.

In the drawings:

Figure 1 is a view of the threshing mechanism combined with the harvesting mechanism as disclosed in the parent application Serial No. 744,021.

Fig. 2 is a view of the mechanism seen from the grain end.

Fig. 3 is a top plan view showing the cylinder housing, the means for taking the grain to and removing the straw from the cylinder, and showing the cleaner in top plan.

Fig. 4 is a sectional view through the cylinder and receiving aprons taken on line 4—4 of Fig. 3.

Fig. 5 is a view of the cylinder housing seen from the top with the rollers for the aprons and rake, and means for operating the parts.

Fig. 6 is a view in side elevation of the cleaner.

Fig. 7 is a sectional view of the threshing cylinder.

Fig. 8 is a view of the cylinder housing with the detail of the operating means.

Like characters of reference designate corresponding parts throughout the several views.

The improved threshing mechanism which forms the subject matter of this divisional application and as disclosed in the parent application above mentioned comprises a main frame 10 supported upon wheels 11 corresponding to the usual bull wheel and 12 corresponding to the usual grain wheel. Upon the main frame 10 a prime mover 13 is mounted which serves to drive the threshing mechanism through the medium of clutch members 14 and shaft 15.

Mounted also upon the frame 10 is a rod 16 to which is pivoted an auxiliary frame 17 carrying a cutter bar 18 and reel 19 which form no part of the present divisional application.

To the rearward of the shaft 16 a shaft 20 is rigidly mounted and thereon are journaled two cylinder sections indicated in their entirety by 21, the detail of said cylinder sections forming the subject matter of aforesaid copending divisional application, Serial No. 749,097.

Journaled adjacent the forward side of the main frame 10 is a shaft 22 which said shaft is driven by gears 23 from the main drive shaft 15. Intermediate its ends the shaft 22 is provided with a gear 24 meshing with a gear 25 carried upon a stub shaft 26, the said shaft being provided with sprockets carrying chains 27 which engage sprockets 28 upon the hubs 29 of the cylinder sections. It will be apparent, therefore, that as the shaft 22 is driven from the main drive shaft 15 the cylinder sections will be driven through the medium of said gearing. The cylinder sections are covered by housings 30 open both at the front and rear to permit grain to be introduced into the cylinder by the aprons 31 carried upon rollers 32 at the front of the auxiliary frame 17 adjacent the cutter bar 18 and over rollers 33 mounted to rotate upon the rod 16. The rollers 33 are driven by sprocket chains 34 from the shaft 22, other sprocket chains 35 extending to the rear of the main frame and driving rollers 36. Over the rollers 36 slatted aprons or rakes 37 are employed passing also over rollers 38 adjacent the cylinder so that the straw after passing through the cylinder and concave 39 in the usual manner is discharged upon the rake 37. Under the rake 37 a deck 40 is employed leading downward to a shoe 41 in which is mounted to rotate a worm conveyer 42. The worm conveyer 42 is carried upon the shaft 43 and is driven by a sprocket chain 44 from the shaft 22 as shown more particularly at Fig. 2. At the rear of the rollers 36 and rakes 37 are beaters 45 driven by a sprocket chain 46 from the rollers 36.

From the shoe 41 the grain from the cylinder and the deck 40 is discharged into the elevator shoe 47 where it is engaged by an elevator 48 which in turn discharges into a shoe 49 and is thereby fed to an elevator 50 which elevates the grain to the cleaner 51 which forms the subject matter of the aforesaid copending divisional application. The elevator 48 is driven directly from the shaft 43 as indicated more particularly at Fig. 3 while the elevator 50 is driven through the medium of a sprocket chain 52 driving the shaft 53 of said elevator, said sprocket chain 52 being driven through the medium of a system of sprocket chains 54 from the sprocket 55 which is in turn driven by the sprocket chain 56 from a countershaft 57. The countershaft 57 is driven from the main drive shaft 15 by gears 58 as shown more particularly at Figs. 3 and 5.

From the foregoing description it will be understood that the grain is severed by the cutter bar 18 and is carried by the apron 31 and fed directly between the cylinder 21 and concave 39 where it is threshed in substantially the usual and ordinary manner and discharged by the cylinder upon the rake 37. The grain is separated from the straw by the action of the rake and dropping through such slatted rake slides down the inclined deck 40 upon the conveyer 42 and is thereby carried into position to be elevated by the elevators 48 and 50 to the cleaner. As aforesaid the structure of the cleaner and the structure of the cylinder form the subject matter of copending divisional applications and while shown herein are shown for the purpose of disclosing an operative organized structure but are not claimed in this application.

I claim:

1. In a threshing mechanism, a wheel supported main frame, a cylinder journaled adjacent the front side of the main frame, a straw removing conveyer mounted upon the main frame and extending rearwardly from the cylinder, an auxiliary frame pivoted to the main frame in front of the cylinder, and projecting entirely beyond the forward end of said main frame, and a feeding conveyer carried by the auxiliary frame.

2. In a threshing mechanism, a wheel supported frame, a cylinder journaled upon and extending longitudinally of the frame, and a cleaner carried by the frame mounted wholly beyond one end of the cylinder and in axial alinement therewith, and means to convey grain from the cylinder to the cleaner.

3. In a threshing mechanism, a wheel supported frame, a cylinder mounted upon the frame and extending between the supporting wheels, a cleaner in axial alinement with the cylinder and carried by the frame with one of the supporting wheels interposed between the cylinder and cleaner, and means to convey grain from the cylinder across the path of travel of the supporting wheel to the cleaner.

4. In a threshing mechanism, a frame supported by a plurality of wheels, a cylinder extending longitudinally of the frame between the wheels, a cleaner mounted upon the frame upon the opposite side of one of the wheels from the cylinder, and in axial alinement therewith, and means to convey grain from the cylinder over said interposed wheel to the cleaner.

5. In a threshing mechanism, a frame, a cylinder mounted upon the frame, a cleaner spaced from one end of the cylinder and in substantial alinement therewith, and a motor carried by the frame and positioned in a plane intermediate the cylinder and cleaner.

In testimony whereof I affix my signature in presence of two witnesses.

JOHN D. JONES.

Witnesses:
   GEORGE H. MACDONALD,
   L. L. MORRILL.

Copies of this patent may be obtained for five cents each, by addressing the "Commissioner of Patents, Washington, D. C."